Figure 1:
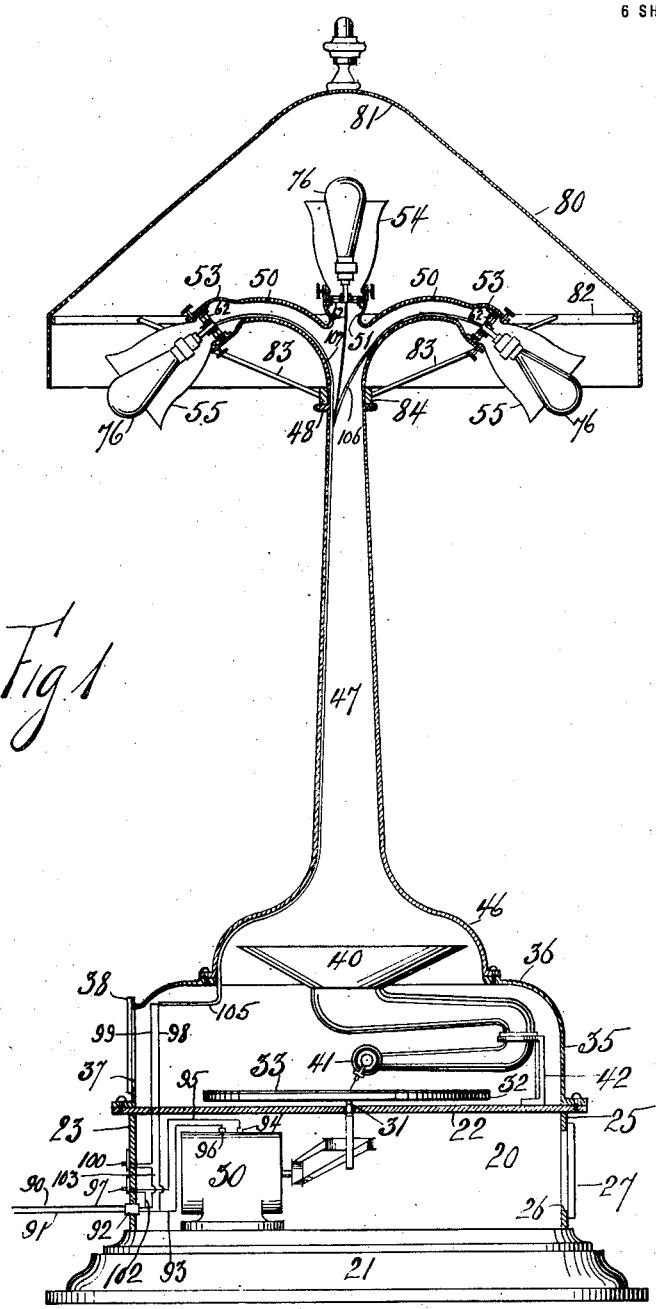

G. E. EMERSON.
LIGHT AND SOUND DISTRIBUTING APPARATUS.
APPLICATION FILED JULY 15, 1913.

1,185,987.

Patented June 6, 1916.
6 SHEETS—SHEET 1.

Witnesses:
Robert E. Samuels
John Jessich

Inventor
George E. Emerson
By his Attorney
A. Ach Bonneville

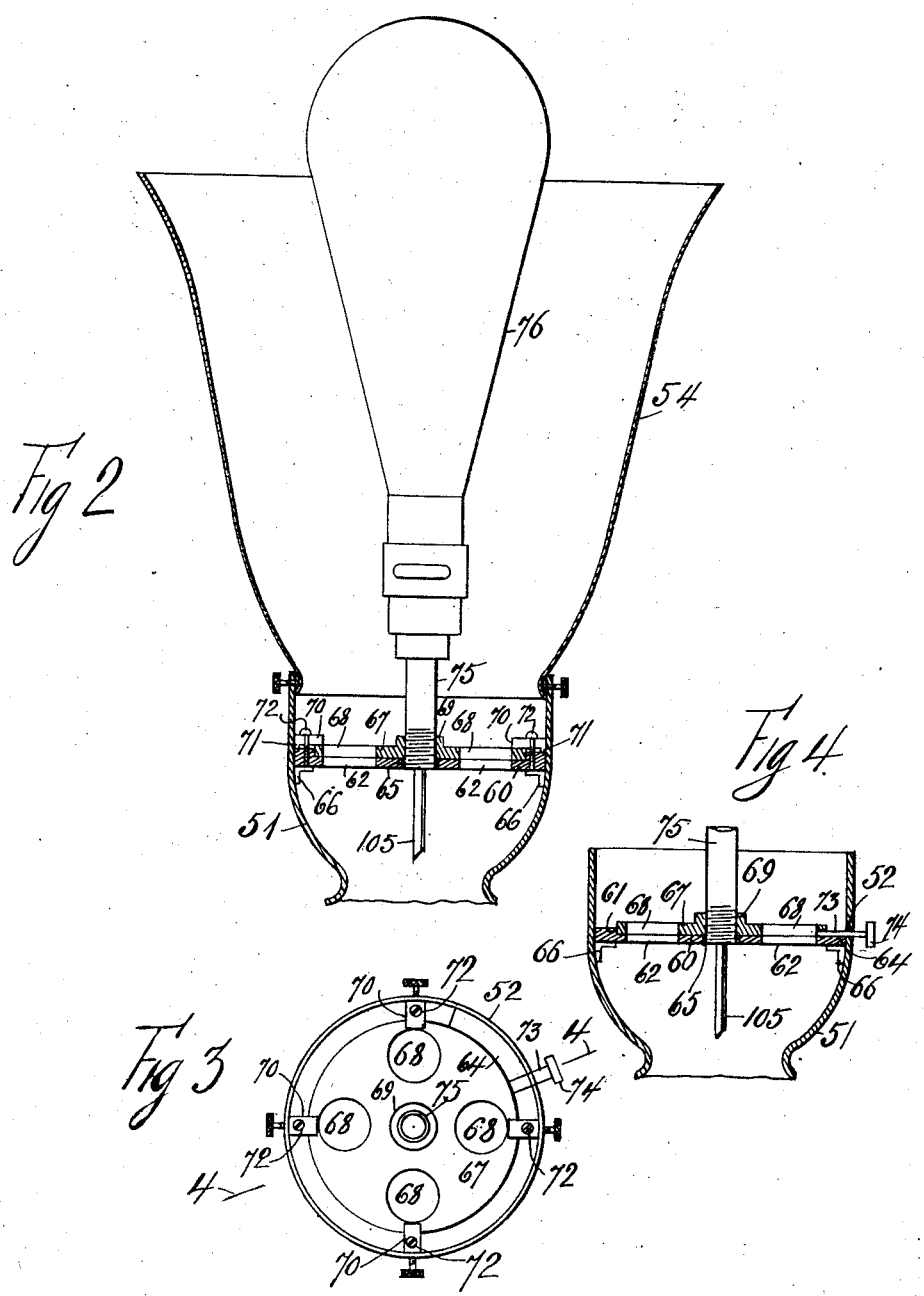

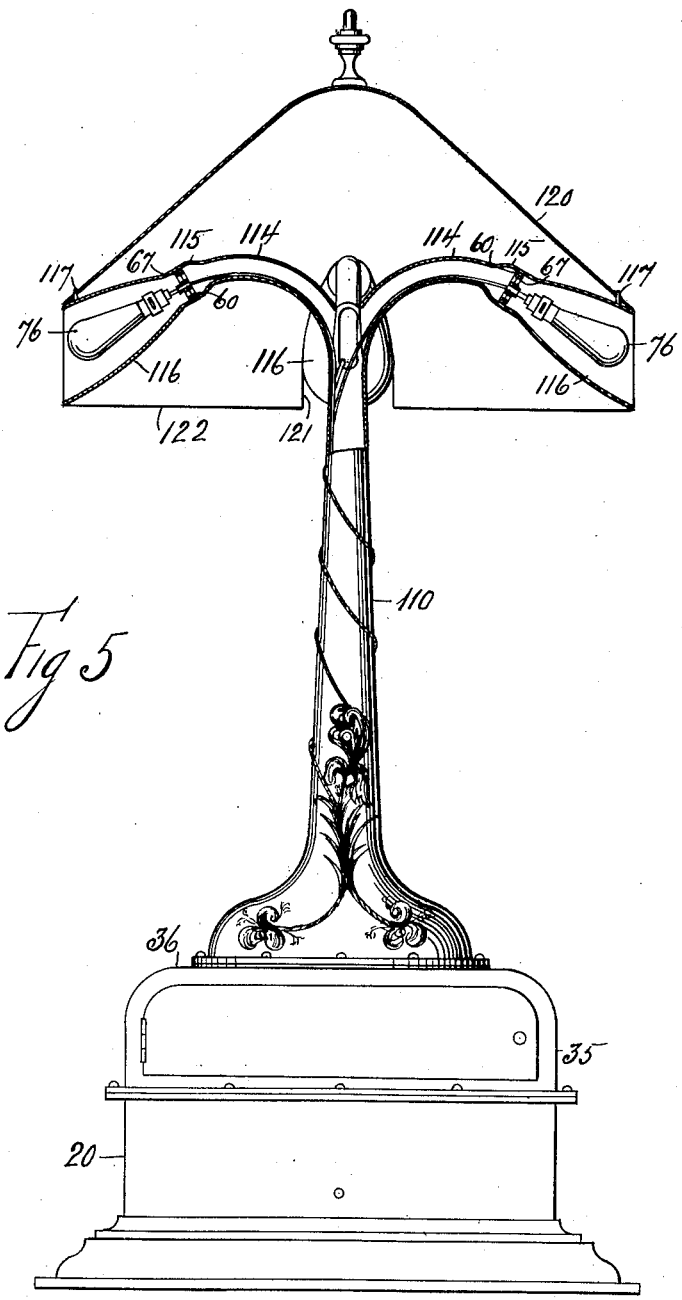

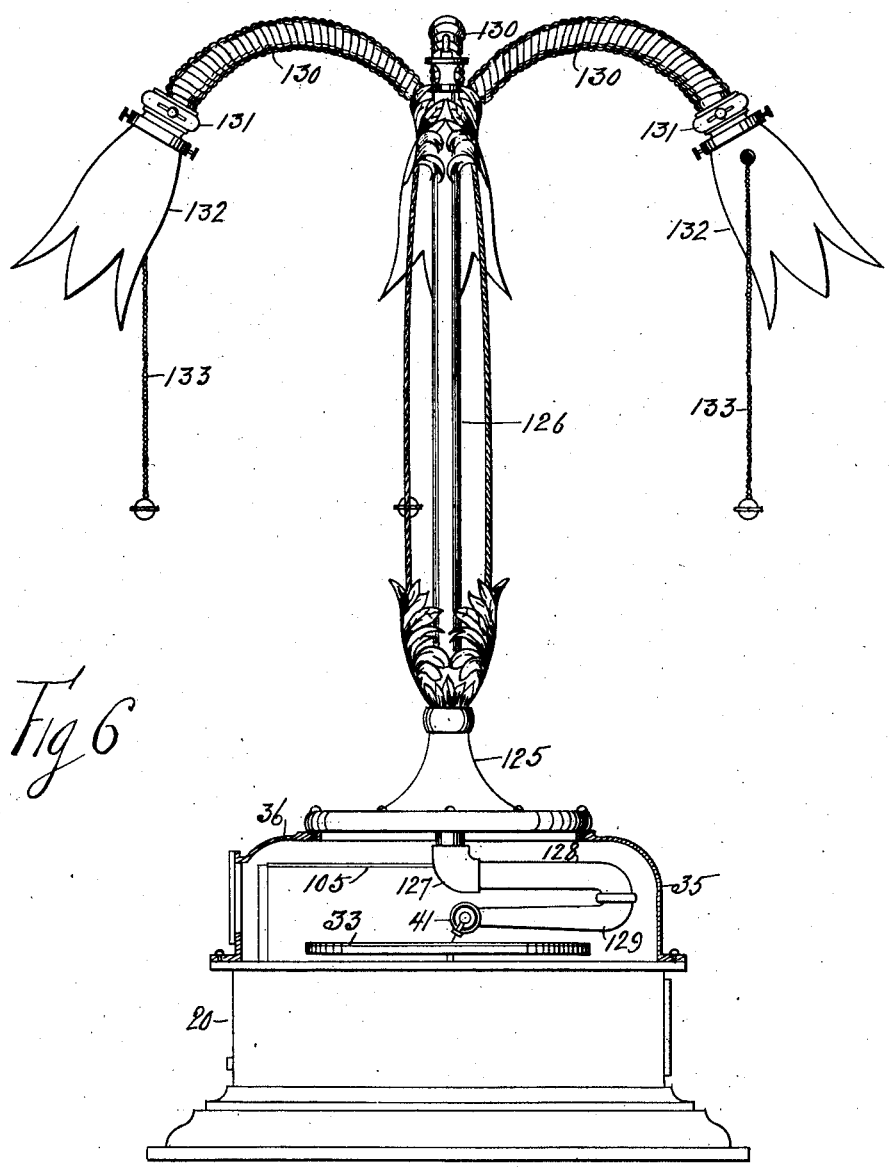

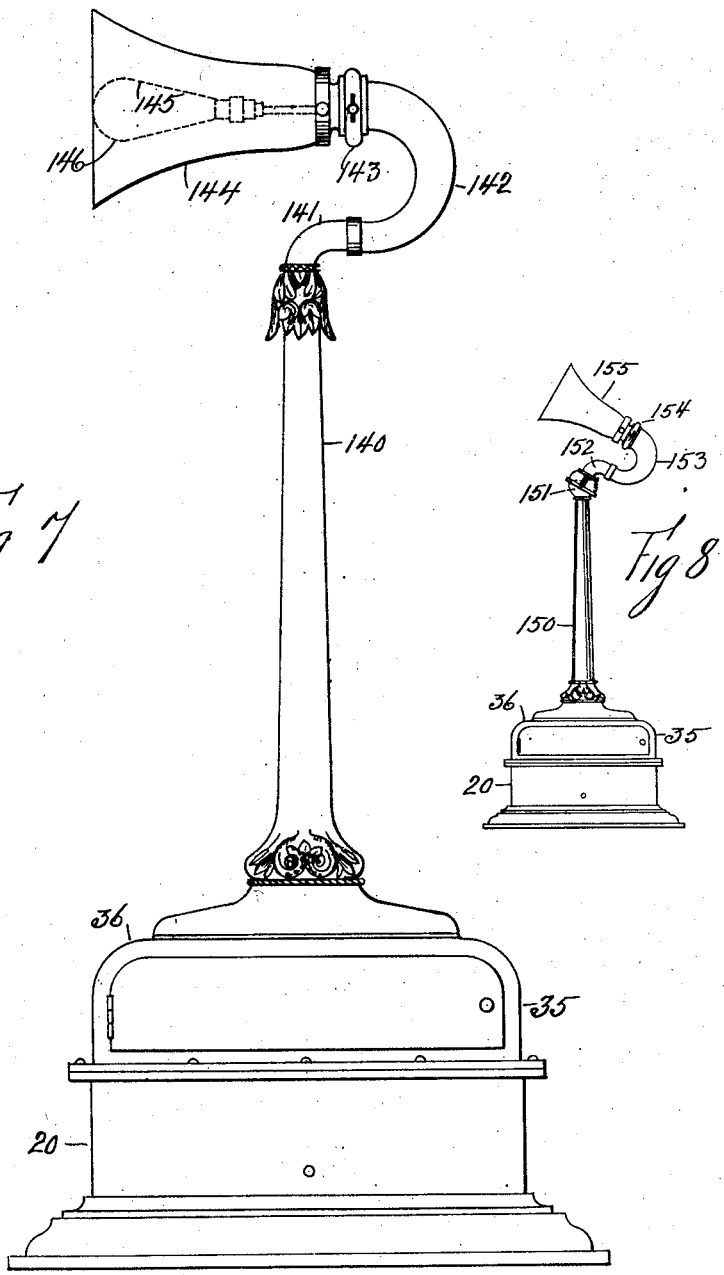

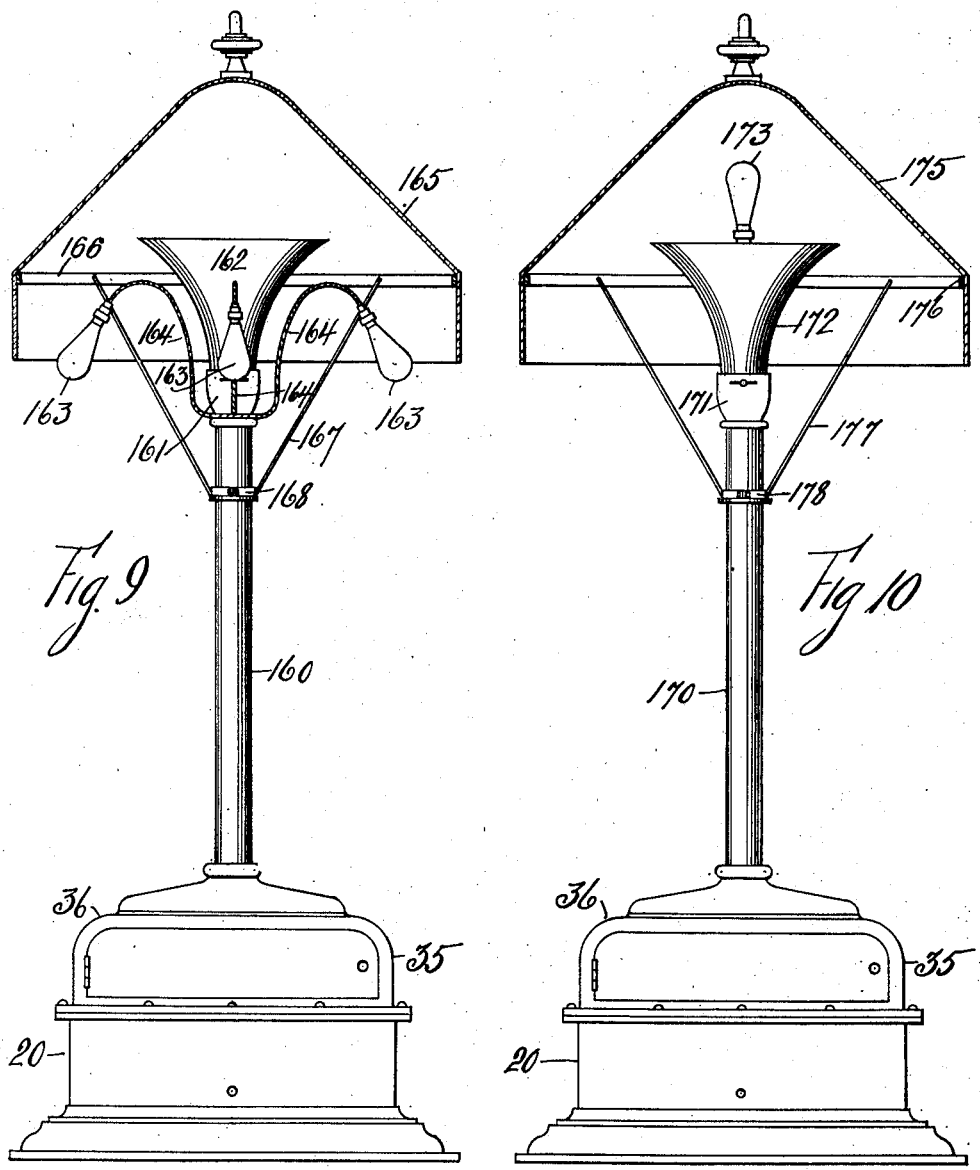

UNITED STATES PATENT OFFICE.

GEORGE E. EMERSON, OF NEWARK, NEW JERSEY, ASSIGNOR, BY MESNE ASSIGNMENTS, TO EMERSON PHONOGRAPH COMPANY, INC., OF NEW YORK, N. Y., A CORPORATION OF NEW YORK.

LIGHT AND SOUND DISTRIBUTING APPARATUS.

1,185,987.  Specification of Letters Patent.  Patented June 6, 1916.

Application filed July 15, 1913. Serial No. 779,101.

*To all whom it may concern:*

Be it known that I, GEORGE E. EMERSON, a citizen of the United States, and a resident of Newark, in the county of Essex and State of New Jersey, have invented certain new and useful Improvements in Light and Sound Distributing Apparatus, of which the following is a specification.

This invention relates to light and sound distributing apparatus.

The organization of the invention comprises means for producing sound waves, said sound waves coacting with the heat of light rays, produced by the appurtenances of the invention, and from which results a distribution of the said sound waves.

The invention assumes the form of a piece of artistic furniture, and specifically comprises a sound producing apparatus coacting with the heat resulting from a source of light, preferably a lamp, the lamp generally consisting of an electric bulb, although other sources of light may be used. The lamp is positioned to coact with the sound waves produced by the apparatus without interfering with the vibrations thereof.

Some of the forms in which the invention may be embodied are shown and described in this application, although the disposition of the elements shown, may be varied in numerous ways without departing from the invention.

The source of light or lamp of the invention is surrounded by an envelop of heated air, the hottest layer being adjacent to the lamp, and the temperatures of the layers decreasing with their distance from the lamp. The velocity of sound increases with the temperature of the transmitting medium, the velocity increasing at about the rate of 23.9 inches with one degree centigrade. The end of the sound wave nearest to the lamp travels faster than the portion more distant from the lamp. The direction of advance of the sound wave before entering the unequally heated mass of air surrounding the lamp is parallel to the axis of the lamp, and variably heated strata of air about the lamp cause a turning of the sound wave, so that the direction of advance thereof is diverged from the axis of the lamp, thereby producing a distribution of the sound waves.

In the various forms of the invention shown and described, in which the source of illumination consists of a lamp within the sound duct or horn of the apparatus, the lamp is separated or stepped off from the latter, so that the advance of the sound waves is not obstructed. When a lamp shade is used it is preferably made of a translucent material that will reverberate from the effects of the sound waves impinging thereon, and thereby perform the functions of a sound horn.

Referring to the accompanying drawings, Figure 1 represents an elevation and partial axial section of one form of the invention, Fig. 2 shows an enlarged fragmentary portion of Fig. 1, Fig. 3 is a top view of Fig. 2 with some of the elements omitted, Fig. 4 shows a section of Fig. 3 on the line 4, 4, Fig. 5 represents an elevation and partial vertical axial section of a modification of the invention, Fig. 6 shows an elevation and partial axial section of a second modification of the invention, Fig. 7 shows an elevation of a third modification of the invention, Fig. 8 represents a modification of Fig. 7 and Figs. 9 and 10 show elevations of further modifications of the invention.

Referring particularly to Figs. 1 to 4, a motor box is shown at 20 having the base frame 21, the roof plate 22, the side wall 23 carrying electric appurtenances to be described, and the side wall 25 having formed therein the large opening 26 with the door 27. The motor box in this instance contains the electric motor 30, although other styles of motors may be used. The motor 30 is belted to the spindle 31 of the turntable 32 carrying the disk record 33. A sound producing compartment with the wall 35 and crown 36 is detachably supported on the plate 22 and has formed therein a large opening 37 with the door 38. A horn 40 with the speaker 41 is supported on the support 42 and is located over the disk record 33. Upon the crown 36 of the sound complement is detachably supported the hollow base 46 of a combined lamp stand and sound duct 47 having extending from its outer surface the flange 48. From the top of the stand 47 extend curved branch sound ducts 50. At the intersection of the ducts 50 is formed a bell end 51 with a guide slot 52, and at the ends of the said ducts 50 are formed bell ends 53 having guide slots, which latter bell ends and slots are similar to 51 and 52. The bell end 51 carries a bell shaped globe 54, and the bell ends 53 carry similar bell shaped globes 55. The globes 54 and 55 constitute sound horns for the sound duct 47. The globes 54 and 55 may consist of any suitable material and may be of clear glass or of translucent and reverberating material.

In each of the bell shaped ends 51 and 53 there is provided a sound regulating device consisting of the disk 60 shouldered at 61 and having perforations 62, guideway 64 and axial opening 65. The disk 60 is held in place in its bell end by means of the knees 66. A rotatable disk 67 with perforations 68 and hollow hub 69 is located upon the disk 60, being guided by the shoulder 61. The perforations 68 are of equal area with the perforations 62. Adjusting clips 70 have heels 71, that bear on the outer circumferential portion of the disk 60, and their other ends bear on the disk 67. Adjusting screws 72 are in threaded engagement with the disk 60 and enable the clips 70 to bear with requisite pressure upon the disk 67, to produce sufficient frictional resistance between the two disks to hold the disk 67 in proper position, when variable sound ports are formed with the perforations 62 and 68. A regulating handle 73 with the knob 74 extends from the disk 67, bears on the guideway 64 and extends through the guide slot 52. A conduit 75 is fastened to the hub 69 and supports the electric lamp 76. The axial center of the lamp 76 coincides with the axial center of the globe fastened to its accompanying bell end. Sufficient room is left between the outer surface of the lamp and the inner surface of its globe to permit the easy transmission of sound waves from the ducts of the apparatus. A lamp shade 80 preferably of translucent reverberating material with a parabolic crown 81 is carried on a supporting ring 82, which latter is carried by rods 83 extending from a ring 84, the latter being preferably made in two halves, so that it can be clamped in place on the upper portion of the duct 47 and supported on the flange 48 of the latter. A pair of mainline wires 90, 91 for electric current extend to the plug 92 supported in the wall 23 of the motor box 20. A wire 93 extends from the plug 92 to a binding post 96 on the electric motor 30, and a wire 95 extends from a second binding post 94 on the motor to a controlling switch 97 in the said wall 23. The wire 93 has extending therefrom the wire 98 and a wire 99 leading from the plug 92 is connected with a second controlling switch 100. A wire 102 connects the switch 97 with the plug 92 and a wire 103 connects said plug and switch 100. The wires 98 and 99 are wound together into a coil 105. The coil 105 extends through the conduit 47 of the lamp and the central bell shaped end 51, and branch coils 106, 107 extend through the ducts 50 to conduct the requisite electric energy to the lamps 76 of the bell ends.

The operation of the invention is evident from the description of the parts and it will suffice to say that by means of the controlling switch 97, the motor 30 can be either started or stopped, thereby controlling the rotations of the turn-table 32 and the production of sound from the disk record 33, with the coöperation of the speaker 41 and horn 40. The controlling switch 100 enables the operator to energize the lamps 76 and shut off the current therefrom. The sound apparatus and the lamps may be either made to perform their functions separately or simultaneously. When the sound waves leave the horn 40 they travel up the duct 47 and pass through the globes 54, 55 which latter constitute secondary horns. After the sound waves leave the globe 54 they strike the parabolic crown 81 of the lamp shade 80, reverberate the latter and are deflected therefrom. If the lamps 76 are energized, when the sound waves reach the globes 54 and 55 they are distributed by the heat radiating from said lamps.

In Fig. 5 the motor box 20 with its appurtenances, and the sound producing compartment with the wall 35 and crown 36 are similar to those already described. The stand in this instance indicated by the numeral 110 is ornamented and hollow and also constitutes a main sound duct. From the upper end of the duct 110 extend, in this instance, three curved branch sound ducts 114, which each have formed therewith bell ends 115, that contain the disks 60 and 67, the lamps 76 and their appurtenances as already described. The bell ends 115 have formed therewith the combined lamp globes and sound horns 116 preferably of translucent and reverberating material and that have extending therefrom the pins or projections 117. A lamp shade 120 preferably of translucent and reverberating material is formed with openings 121 extending up from the lower edge 122 theerof. The shade bears upon the horns 116, the openings 121 registering therewith, and the pins 117 enter small openings formed in the lamp shade 120.

In Fig. 6 is represented the motor box 20 with its appurtenances and the sound producing compartment with the wall 35 and crown 36. Both the motor box and sound producing compartment are similar to those already described. A lamp stand 125 is fastened to the crown 36 and has fastened in the axial center thereof the main sound duct 126. A pipe fitting 127 with the horizontal pipe 128 is fastened to the sound duct 126, and the pipe 128 has flexibly jointed thereto the arm 129 with the speaker 41. The latter coacts with the disk record 33 as shown. From the upper end of the main sound duct 126 extend the flexible branch sound ducts 130, that gradually increase in diameter from their inner to their outer ends. The ducts 130 have each connected thereto the bell end 131, which is similar and contains appurtenances similar to the bell ends 51 and 53 already described. To the bell ends 131 are attached the combined drooping lily lamp shades and sound horns 132 that contain lamps similar to 76, and which are controlled by the chains 133. To energize the lamps the coil 105 enters the sound duct 126 and extends to the lamps of the apparatus. The lamp shades 132 are preferably made of translucent material that will reverberate with sound waves.

In Fig. 7 the motor box 20, and a sound producing compartment having the wall 35 and crown 36, with their contents are preferably similar to the form shown in Fig. 6. The stand in this instance is indicated at 140 being appropriately ornamented. The stand contains a sound duct similar to 126, which latter has extending therefrom the elbow 141 to which is attached the hollow goose neck 142, the latter increasing in diameter from its lower to its upper end. A bell end 143 is attached to the upper end of the goose neck and is similar and has appurtenances similar to the bell ends 131. A globe 144 is provided with a lamp having the bulb 145 and which in addition to its function as a distributer of light performs the function of a sound horn. By reason of the form of the globe 144 and form of the bulb 145, there is produced an annular space between the bulb and globe which, in a plane taken through the longitudinal axis of said elements resembles the form of a sound horn as indicated at 146.

In Fig. 8 the motor box 20, and a sound producing compartment having the wall 35 and crown 36, with their appurtenances are preferably similar to those shown in Fig. 6. The lamp stand is indicated at 150, which is capped by a hollow ball and socket joint 151. The stand preferably contains a sound duct similar to 126, which leads to the hollow ball and socket joint. An elbow 152 extends from the ball and socket joint 151 and connects with the hollow goose neck 153. A bell end 154 is attached to the upper end of the goose neck and is similar and has appurtenances similar to the bell end 131. A globe and sound horn 155 is provided for a lamp contained therein, which also performs the function of a sound horn. By means of the ball and socket joint the globe and sound horn 155 can be placed in any angular position to direct the sound and light waves in any direction. In Fig. 9 the motor box 20, with a sound producing compartment having the wall 35 and crown 36 with their contents are preferably similar to the form shown in Fig. 6. The lamp stand which constitutes the sound duct is indicated at 160. A bell end 161 with appurtenances similar to those of the bell end 53 and its appurtenances is formed at the top end of the stand 160. A sound horn 162 extends from the bell end 161. A plurality of inverted lamps 163 are supported on the ends of the goose necks 164, that extend from the top end of the stand 160 and which may be flexible. A lamp shade 165 of translucent reverberating material and preferably parabolic at its crown is supported on the ring 166, and the latter is carried on the rods 167 extending from the ring 168, detachably connected to the stand 160.

In Fig. 10 the motor box 20, with a sound producing compartment having the wall 35 and crown 36 with their contents, are preferably similar to the form shown in Fig. 6. The lamp stand which constitutes the sound duct is indicated at 170. A bell end 171 with appurtenances similar to the bell end 53 and its appurtenances is formed at the top end of the stand 170. A sound horn 172 extends from the bell end 171. A lamp 173 is supported in the axial center of the sound horn being stepped from it in a manner similar to that shown in Fig. 2, so as not to obstruct the sound waves. A lamp shade 175 preferably of translucent material and parabolic at its crown is supported on the ring 176 and the latter is carried on the rods 177, extending from the ring 178 that is detachably connected to the stand 170. The lamp shade 175 is also preferably made of reverberating material.

Having described my invention what I desire to secure by Letters Patent and claim is:

1. In an apparatus of the character described, the combination of a sound producing device, a sound duct for the device and an exposed lamp at the outer end of said duct adapted by means of the heat radiation to deflect the sound produced.

2. In an apparatus of the character described the combination of a sound producing device, a main sound duct for the device, branch ducts extending from the main duct, a lamp at the outer end of each branch duct to deflect the sound produced and a shade over the lamps.

3. In an apparatus of the character described the combination of a sound producing device, sound ducts coacting with said device, sound regulating means connected to each duct, a lamp at the outer end of each duct, a globe for each lamp constituting a sound horn and a shade having a parabolic surface over the globes constituting a secondary sound horn.

4. In an apparatus of the character described the combination of a sound producing device, a main sound duct for the device, branch ducts extending from the main duct, a lamp at the outer end of each branch duct and a shade over the lamps.

5. In an apparatus of the character described the combination of a sound producing device, a sound duct for the device, a bell at the upper end of the sound duct and coaxial therewith, a globe for the bell end, a lamp in the axial center of the globe and a lamp shade over the globe performing the functions of a sound horn.

6. In an apparatus of the character described the combination of a sound producing device, a main sound duct for the device, a bell end at the upper end of the sound duct and coaxial therewith, a globe for the bell end, a lamp for the globe, a plurality of branch sound ducts extending from the main sound duct, a bell end for each of the branch ducts, a globe for each of the latter bell ends, a lamp for each of the latter globes and a shade over all the globes to reverberate with the sound waves produced and perform the functions of a sound horn.

7. In an apparatus of the character described the combination of a sound producing device, a main sound duct for the device, a bell end at the upper end of the main duct, a globe for the bell end, a lamp for the globe, a plurality of branch sound ducts extending from the main sound duct, globes for the branch ducts, a lamp for each of the latter globes, a sound controlling device for the bell end, and for each of the branch ducts and a lamp shade to reverberate with the sound produced, located over all the globes.

8. In an apparatus of the character described the combination of a sound producing device, a sound duct extending from the device, a bell end having a guide slot at the outlet end of the duct, a stationary disk having perforations in the bell end, a rotatable disk having perforations registering with the stationary disk, a regulating handle for the rotatable disk extending through the guide slot of the bell end and adjusting clips with one end of each bearing on the stationary disk and the other end bearing on the rotatable disk.

Signed at the borough of Manhattan in the county of New York and State of New York this 14th day of July, A. D. 1913.

GEORGE E. EMERSON.

Witnesses:
ARTHUR COLLINS,
MARY CROFTON.